United States Patent
Horie et al.

(10) Patent No.: US 11,947,725 B2
(45) Date of Patent: Apr. 2, 2024

(54) FORCE SENSE PRESENTATION DEVICE AND FORCE SENSE PRESENTATION METHOD

(71) Applicant: JAPAN SCIENCE AND TECHNOLOGY AGENCY, Saitama (JP)

(72) Inventors: Arata Horie, Tokyo (JP); Masahiko Inami, Tokyo (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 17/641,643

(22) PCT Filed: Aug. 26, 2020

(86) PCT No.: PCT/JP2020/032185
§ 371 (c)(1),
(2) Date: Mar. 9, 2022

(87) PCT Pub. No.: WO2021/049296
PCT Pub. Date: Mar. 18, 2021

(65) Prior Publication Data
US 2022/0308671 A1 Sep. 29, 2022

(30) Foreign Application Priority Data
Sep. 9, 2019 (JP) .................................. 2019-163973

(51) Int. Cl.
*G06F 3/01* (2006.01)
*G06V 20/40* (2022.01)

(52) U.S. Cl.
CPC .............. *G06F 3/016* (2013.01); *G06V 20/40* (2022.01)

(58) Field of Classification Search
CPC .......... G06F 3/016; G06V 20/40; B60N 2/002
See application file for complete search history.

(56) References Cited

U.S. PATENT DOCUMENTS

2012/0274576 A1* 11/2012 Los ...................... B81C 1/0038
                                                        345/173
2015/0048933 A1    2/2015 Danieau et al.
(Continued)

FOREIGN PATENT DOCUMENTS

| CN | 102016759 A | 4/2011 |
| JP | 2008077631 A | 4/2008 |

(Continued)

OTHER PUBLICATIONS

Partial Search report issued for corresponding European Patent Application No. 20862180.5 and the cited documents, dated Aug. 7, 2023.

(Continued)

*Primary Examiner* — Premal R Patel
(74) *Attorney, Agent, or Firm* — MUNCY, GEISSLER, OLDS & LOWE, P.C.

(57) ABSTRACT

A force sense presentation device that presents a force sense force by forming a dynamic quantity distribution on a skin of a person includes a plurality of stimulation elements and a controller. Each of the plurality of stimulation elements stimulates the skin of the person. The controller controls the plurality of stimulation elements such that a dynamic quantity distribution for generating a target force sense is formed on the skin. An interval between the adjacent stimulation elements is an interval enabling presentation of a spatially continuous force sense. The force sense generates a self-kinesthetic sense of the person.

28 Claims, 13 Drawing Sheets

(56) References Cited

U.S. PATENT DOCUMENTS

| | | | | |
|---|---|---|---|---|
| 2015/0175172 A1* | 6/2015 | Truong | ................... | G10L 25/48 |
| | | | | 701/36 |
| 2016/0058335 A1* | 3/2016 | Ashby | ................... | A61B 5/1118 |
| | | | | 600/595 |
| 2017/0220111 A1 | 8/2017 | Nakamura et al. | | |
| 2017/0351370 A1* | 12/2017 | Oh | ......................... | G06F 21/31 |
| 2018/0300996 A1 | 10/2018 | Turcott | | |
| 2018/0300998 A1 | 10/2018 | Israr et al. | | |

FOREIGN PATENT DOCUMENTS

| | | |
|---|---|---|
| JP | 2012033146 A | 2/2012 |
| JP | 2012524319 A | 10/2012 |
| JP | 2016533534 A | 10/2016 |
| JP | 2018008250 A | 1/2018 |
| KR | 20190054357 A | 5/2019 |
| WO | WO2009035100 A1 | 3/2009 |

OTHER PUBLICATIONS

Office Action issued for corresponding Chinse patent application No. 202080060322.9, dated Aug. 24, 2023, along with the machine translation thereof.

Arata Horie et al., "Buttock Skin Stretch: Inducing Shear Force Perception and Acceleration Illusion on Self-motion Perception", Springer International Publishing AG, part of Springer Nature 2018, pp. 135-147.

* cited by examiner

FORCE SENSE PRESENTATION DEVICE AND FORCE SENSE PRESENTATION METHOD

TECHNICAL FIELD

The present invention relates to a force sense presentation device and a force sense presentation method for presenting a force sense by stimulating a skin of a person.

BACKGROUND ART

In virtual reality, telepresence, and the like, it is necessary to give a high sense of reality to a user, and thus, it is desirable to be able to present a sense of force. For example, a motion platform used in an entertainment facility or a flight simulator moves or tilts the user to give the user a feeling of the user performing a motion or the user being spatially displaced (see, for example, Patent Literature 1).

CITATION LIST

Patent Literature

[Patent Literature 1] JP 2016-533534 W

SUMMARY OF INVENTION

Technical Problem

As described above, the motion platform reproduces an actual motion to realize a vestibular sense and a force sense exerted from a seat surface and a back surface, and gives the user a feeling of the user performing the motion. However, since it is necessary to reproduce the same motion as a target motion, there is a problem that a reproducible motion largely depends on the mechanical characteristics of a housing, and an expressible motion is limited. In addition, there are problems that the motion platform is large and expensive, and the motion platform cannot be attached to an existing chair.

If it is possible to present a force sense such as a kinesthetic sense accompanying a three-dimensional motion, for example, by stimulating the skin of a person without actually moving or tilting the person as in the motion platform, it is expected to greatly contribute to solve the above problems.

The present invention has been made in view of the above problems, and an object of the present invention is to present a force sense that causes a person to feel as if the person is performing a motion by stimulating a skin of the person.

Solution to Problem

In order to solve the above problems, a device according to an aspect of the present invention is a force sense presentation device that presents a force sense by forming a dynamic quantity distribution on a skin of a person. The device includes: a plurality of stimulation elements; and a controller. Each of the plurality of stimulation elements stimulates the skin of the person. The controller controls the plurality of stimulation elements such that a dynamic quantity distribution for generating a target force sense is formed on the skin. An interval between the adjacent stimulation elements is an interval enabling presentation of a spatially continuous force sense. The force sense generates a self-kinesthetic sense of the person.

The force sense presentation device may further include: a storage structured to store a relationship between the target force sense and the dynamic quantity distribution for generating the force sense; and a force sense instructor. When the target force sense is instructed from the force sense instructor, the controller controls the stimulation elements such that the dynamic quantity distribution for generating the force sense stored in the storage is formed on the skin.

The controller may calculate the dynamic quantity distribution for generating the target force sense, and control the stimulation elements to stimulate the skin to form the dynamic quantity distribution.

The force sense presentation device may further include: a learner structured to learn a relationship between the presented force sense and the dynamic quantity distribution for generating the force sense.

The stimulation element may present the force sense to a body part including a back or buttocks.

The stimulation element may present the force sense to a body part including a hand or a foot. At this time, the controller may control the stimulation element to form, on the skin, a dynamic quantity distribution corresponding to stretch of the skin generated when the body part is moved.

The dynamic quantity distribution may be a strain energy density distribution.

The controller may control the stimulation element such that a strain energy density increases when the target force sense increases.

The stimulation element may stimulate the skin by rotational movement. Hereinafter, such a stimulation element may be referred to as a "rotational stimulation element". At this time, the controller may control a rotation angle and a rotation direction of the stimulation element.

The controller may control the stimulation element such that the rotation angle of the stimulation element increases when the target force sense increases.

A set including a plurality of stimulation elements among the stimulation elements may be combined into a stimulation element unit.

The stimulation element unit may include a two-axis gimbal.

The controller may move a stimulation point for stimulating on the skin of the person. The controller may control the stimulation element such that the rotation angle of the stimulation element increases when a distance from the stimulation point decreases.

The dynamic quantity distribution may be a distribution of a strain. At this time, the strain may be a main strain or an equivalent strain.

The dynamic quantity distribution may be a distribution of a force. At this time, the force may be a shear force or a vertical resistance force.

The dynamic quantity distribution may be a distribution of a stress. At this time, the stress may be any of a pressure, a main stress, and a Mises stress.

An interval between the adjacent stimulation elements may be such an interval that the force senses presented by the adjacent stimulation elements have an overlapping range.

The force sense presentation device may include a dynamic change detector; and a dynamic quantity distribution calculator. The dynamic change detector detects a dynamic change of the skin of the person caused by a motion of the person. The dynamic quantity distribution calculator calculates a dynamic quantity distribution of the skin for generating the dynamic change from the change of the dynamic quantity distribution of the skin of the person detected by the dynamic change detector. The controller controls the plurality of stimulation elements to form, on the skin, the dynamic quantity distribution calculated by the dynamic quantity distribution calculator.

Each of the plurality of stimulation elements may include the dynamic change detector.

The dynamic change detector may be a sensor provided independently of the stimulation element.

The force sense presentation device may include: a camera structured to capture a subjective video viewed from the person; and a video synchronizer structured to calculate a relationship between the dynamic change of the skin of the person and a change of the subjective video. On the basis of the relationship between the dynamic change of the skin of the person and the change of the subjective video calculated by the video synchronizer, the dynamic quantity distribution calculator may calculate the dynamic quantity distribution of the skin for generating the dynamic change from the dynamic change of the skin of the person when the subjective video changes.

Still another aspect of the present invention is a force sense presentation method for presenting a force sense by forming a dynamic quantity distribution n on a skin of a person. This method includes: determining a relationship between the force sense and the dynamic quantity distribution for generating the force sense; and stimulating a plurality of portions of the skin to form, on the skin, the dynamic quantity distribution for generating the force sense. An interval between adjacent portions of the skin to be stimulated is an interval enabling generation of a spatially continuous force sense. The force sense generates a self-kinesthetic sense of the person.

The dynamic quantity distribution in the force sense presentation method may be a strain energy density distribution.

The force sense presentation method may include: detecting a dynamic change of the skin of the person caused by a motion of the person; and calculating a dynamic quantity distribution of the skin for generating the dynamic change from the detected dynamic change of the skin of the person; and stimulating a plurality of portions of the skin to form the calculated dynamic quantity distribution on the skin of the person.

The force sense presentation method described above may include: capturing a subjective video viewed from the person; and calculating a relationship between the dynamic change of the skin of the person and a change of the subjective video. At this time, in calculating the dynamic quantity distribution of the skin for generating the dynamic change, on the basis of the calculated relationship between the dynamic change of the skin of the person and the change of the subjective video, the dynamic quantity distribution of the skin for generating the dynamic change may be calculated from the dynamic change of the skin of the person when the subjective video changes.

Note that any combination of the above components and modifications of the expressions of the present invention in devices, methods, systems, recording media, computer programs, and the like are also effective as aspects of the present invention.

Advantageous Effects of Invention

According to the present invention, it is possible to present the force sense that causes a person to feel as if the person is performing a motion by stimulating the skin of the person.

DESCRIPTION OF EMBODIMENTS

Figure 1:
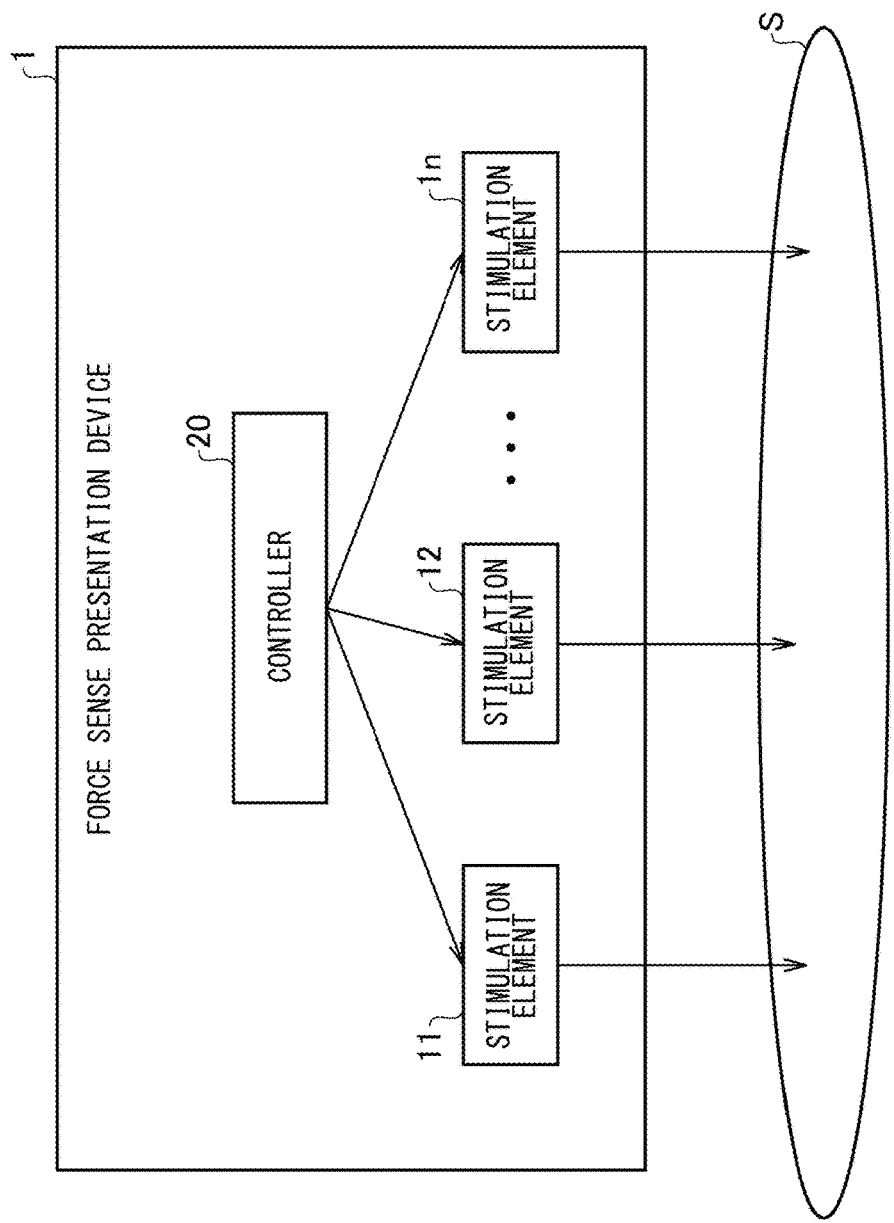
FIG. 1 is a functional block diagram of a force sense presentation device according to a first embodiment.

Hereinafter, a preferred embodiment of the invention will be described with reference to the accompanying drawings. In the embodiment and a modification, the same or equivalent components, steps, and members are denoted by the same reference numerals, and repeated description is appropriately omitted. In addition, the dimensions of the members in each drawing are appropriately enlarged or reduced for easy understanding. In addition, in the drawings, some of the members that are not important for describing the embodiment are omitted. In addition, terms including ordinal numbers such as first and second are used to describe various components. However, these terms are used only for the purpose of distinguishing one component from other components, and the components are not limited by the terms.

Before describing specific embodiments, basic knowledge will be described. As a result of research, the present inventor has found that by applying shear deformation (deformation along the direction of the skin) to the skin of the buttocks of a person, it is possible to reproduce an acceleration sense induced at the time of riding on a vehicle and a kinesthetic sense in a vertical direction at the time of passing over undulations.

For example, when a driver accelerates or decelerates or turns the steering while sitting on the seat of an automobile, a part of the buttocks of the driver is shear-deformed in a front-rear direction or a right-left direction. The present inventor has focused on this phenomenon, and has found that an acceleration sense in the front-back direction and the right-left direction of a subject can be induced and reproduced simply by providing a contactor that moves on the seat in the front-back direction and the right-left direction and applying shear deformation to the buttocks of the subject.

When the user rides on an automobile to pass over a step or undulations, the body moves in the vertical direction and is displaced. It has been found that the sense of such a vertical motion can also be reproduced by shear deformation of the skin. For example, when the buttocks move in the vertical direction from the seat surface of the seat, the peak of the pressure distribution distributed in the vicinity of the sciatic bone is displaced in the direction of the coccyx. The present inventor has paid attention to this phenomenon, and has found that a sense accompanying push-up from the seat surface can be induced simply by presenting the displacement of the peak position of the pressure distribution by the shear deformation of the skin of the buttocks. Furthermore, the present inventor has also found that a sense of passing over the undulations can be induced and reproduced simply by presenting, to the buttocks, a shear force in a traveling direction generated when passing over the undulations.

The inventor considers the reason why such senses are induced as follows. First, when such a shear force is applied to the skin, a distribution of dynamic quantity per unit volume, for example, a distribution of strain energy (hereinafter, referred to as "strain energy density distribution") is formed on the skin. That is, when the person moves while being in contact with a seat or the like, a strain occurs at each portion of the skin. It is considered that the temporal and spatial distribution of the energy density of the strain reflects characteristics such as the type, magnitude, and direction of the motion. In a mechanoreceptor in the skin that controls a force sense, the frequency of neuron firing is determined by the strain energy density distribution. Therefore, it is considered that when the strain energy density distribution corresponding to each of various motions is formed on the skin by stimulating the skin of the person, a feeling of the person performing such motion can be induced to the person without actually moving the person.

The part of the skin to be stimulated is not limited to the buttocks, and may be any part such as the back, the abdomen, the head, the arm, the wrist, or the foot as long as the part is a part in which the strain energy density distribution corresponding to a target motion is formed. In addition, the distribution (hereinafter referred to as "dynamic quantity distribution") of the dynamic quantity corresponding to the target motion is not limited to the strain energy density distribution, and includes the distribution of a strain (for example, a main strain, an equivalent strain, and the like), the distribution of a force (for example, a shear force, a vertical resistance force, and the like), the distribution of a stress (that is, a force per unit area for example, a pressure, a main stress, a Mises stress, and the like), and the like.

Hereinafter, in the present specification, the sense of a person that the person feels as if the person is performing a motion or the person is spatially displaced is referred to as "self-kinesthetic sense". This self-kinesthetic sense is not limited to the kinesthetic sense that is felt at the time of actually performing a motion, for example, at the time of riding on a vehicle. For example, when an object in contact with the skin moves, the person feels as if the person performing a motion relative to the object. Such a sense, that is, the kinesthetic sense that is felt when the person is not actually performing a motion is also included in the self-kinesthetic sense.

In the present specification, "presenting a force sense" refers to presenting, with respect to the sense of force felt by the person, the magnitude and direction of the force.

First Embodiment

FIG. 1 illustrates functional blocks of a force sense presentation device 1 according to a first embodiment. The force sense presentation device 1 presents a force sense by forming a dynamic quantity distribution on a skin S of a person. The force sense presentation device 1 includes n stimulation elements 11, 12, ..., 1n and a controller 20 (n is an integer of two or more).

Each of stimulation elements 11, 12, ..., 1n stimulates the skin S of the person. A method by which the stimulation elements 11, 12, ..., 1n stimulate the skin S may be a dynamic method such as a rotational movement, pulling in a shear direction, compression, or suction. Each of the stimulation elements 11, 12, ..., 1n may be capable of individually presenting a force sense. Alternatively, a configuration may be made in which a plurality of stimulations form a predetermined dynamic quantity distribution in cooperation and then only are able to present a force sense.

The controller 20 controls the stimulation elements 11, 12, ..., 1n so as to form a dynamic quantity distribution for generating a target force sense on the skin S. The controller 20 may be configured by using known computer hardware and software. A method by which the controller 20 controls the stimulation elements 11, 12, ..., 1n may be based on a database or the like stored inside the controller 20, may be based on an input from the outside, or may be based on learning such as machine learning.

An interval between the adjacent stimulation elements is an interval enabling presentation of a spatially continuous force sense. When the interval distance between stimulation elements is too long, the force sense becomes spatially discontinuous. In this case, the dynamic quantity distribution for generating a target force sense cannot be formed on the skin. The interval between adjacent stimulation elements may be, for example, an interval in which the ranges of the force senses presented by the adjacent stimulation elements overlap. Alternatively, the interval between adjacent stimulation elements may be an interval which is within a range of a two-point discrimination threshold in the region of the skin.

The force sense generates a self-kinesthetic sense of the person. That is, by the force sense presented by the force sense presentation device 1, the person feels as if the person is performing a motion or is spatially displaced. As described above, this sense may be a kinesthetic sense which the person feels when the person is actually performing a motion, or may be a kinesthetic sense which the person feels the person is not actually performing a motion.

According to the present embodiment, it is possible to realize a device that presents the force sense that causes the person to feel as if the person is performing a motion by stimulating the skin of the person.

Second Embodiment

Figure 2:
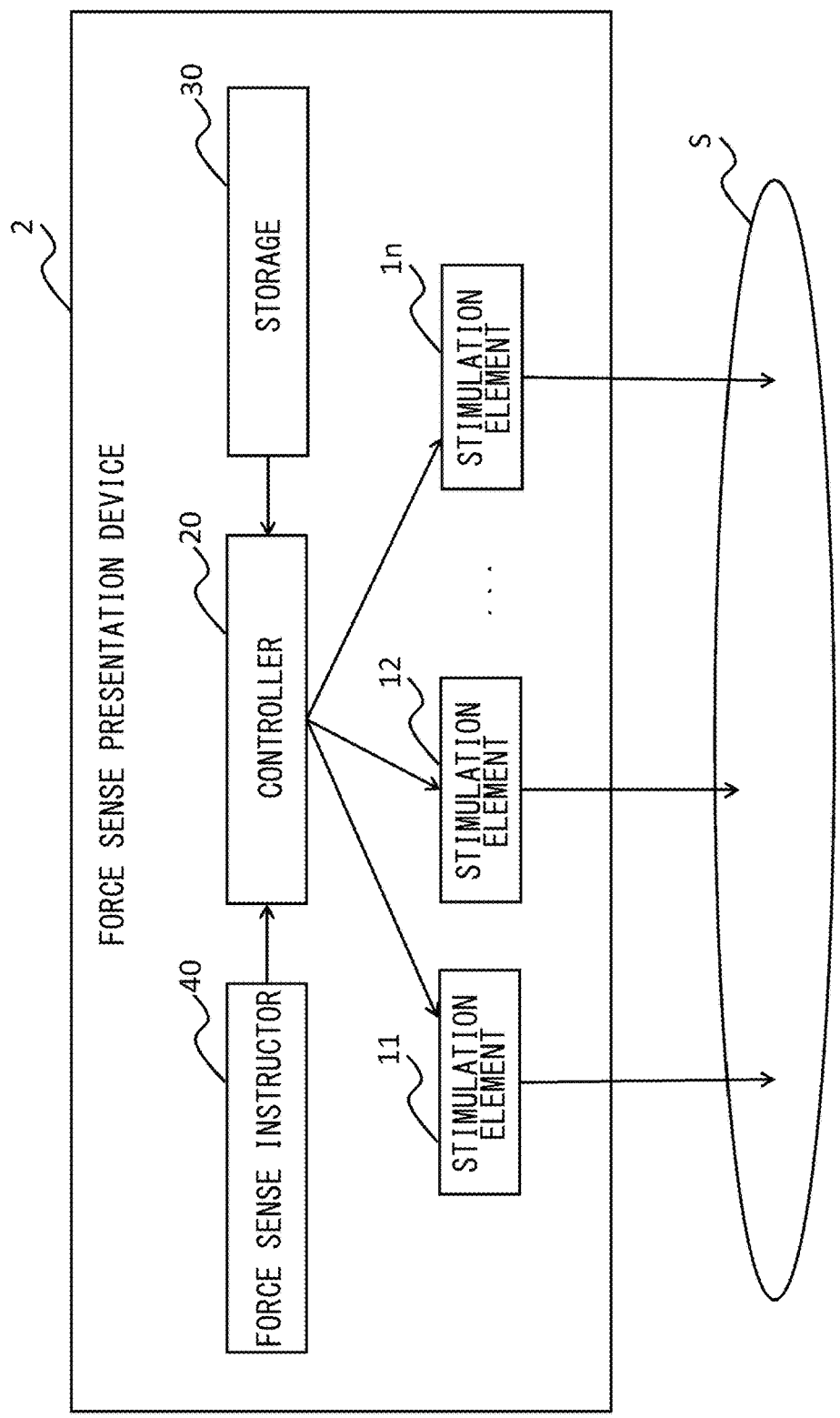
FIG. 2 is a functional block diagram of a force sense presentation device according to a second embodiment.

FIG. 2 illustrates functional blocks of a force sense presentation device 2 according to a second embodiment. The force sense presentation device 2 also presents a force sense by forming a dynamic quantity distribution on the skin S of the person. The force sense presentation device 2 includes the n stimulation elements 11, 12, ..., 1n, the controller 20, a storage 30, and a force sense instructor 40 (n is an integer of two or more). That is, the force sense presentation device 2 includes the storage 30 and the force sense instructor 40 in addition to the configuration of the force sense presentation device 1 in FIG. 1.

Since the configurations and operations of the stimulation elements 11, 12, ..., 1n are the same as those of the force sense presentation device 1, the description thereof is omitted. The storage 30 stores a dynamic quantity distribution for generating a target force sense and a method of controlling each stimulation element for forming the dynamic quantity distribution. For example, the storage 30 stores, as a database, the kind of dynamic quantity and how the dynamic quantity is to be distributed temporally and spatially on the skin S in order to generate a target force sense. Note that, for example, in the case of the dynamic quantity distribution such as a strain energy density distribution, a device for directly measuring the dynamic quantity distribution is not known, but the dynamic quantity distribution can be calculated using simulation as follows. For the simulation, for example, finite element analysis based on a finite element model of a human body is effective. In the simulation, a physical situation that causes a force sense to be presented is used as an input. For example, in a case where it is desired to induce the self-kinesthetic sense while driving an automobile, the acceleration of the automobile is used as an input. At this time, the deformation of the skin according to the acceleration of the automobile can be solved by defining the body weight of the person and the elasticity of the skin as predetermined parameters. Accordingly, a model for calculating the strain energy density distribution can be obtained. The validity of the obtained model can be verified, for example, as follows. That is, an examiner measures the surface pressure of his/her buttocks and back while driving the automobile mounted with, for example, a commercially available acceleration sensor and a surface pressure distribution measurement seat. By comparing this measurement result with the surface pressure calculated from the model, it is possible to verify how reasonable the model is. As a result of the comparison, in a case where a difference between the measured value and the calculated value from the model is large, simulation can be performed again to improve the model.

The force sense instructor 40 instructs the controller 20 to generate a target force sense. When the target force sense is instructed from the force sense instructor 40, the controller 20 controls the stimulation elements 11, 12, ..., 1n to form a dynamic quantity distribution for generating the force sense stored in the storage 30 on the skin S.

According to the present embodiment, it is possible to present a desired force sense at a desired timing by storing, in the storage 30, a relationship between the target force sense and a dynamic quantity distribution for generating the force sense.

Third Embodiment

In FIG. 1, the controller 20 may calculate the dynamic quantity distribution for generating the target force sense, and control the stimulation elements 11, 12, ..., 1n to stimulate the skin S to form the dynamic quantity distribution. In a case where the dynamic quantity distribution can be calculated by a relatively simple model as in a case where a force sense obtained by rolling a roller on the back of the person is presented, unlike the second embodiment, it is no longer necessary to calculate and store the dynamic quantity distribution by finite element analysis based on a finite element model of the human body, which saves hardware resources.

According to the present embodiment, the desired force sense can be presented by calculating the dynamic quantity distribution for generating the target force sense.

Fourth Embodiment

Figure 3:
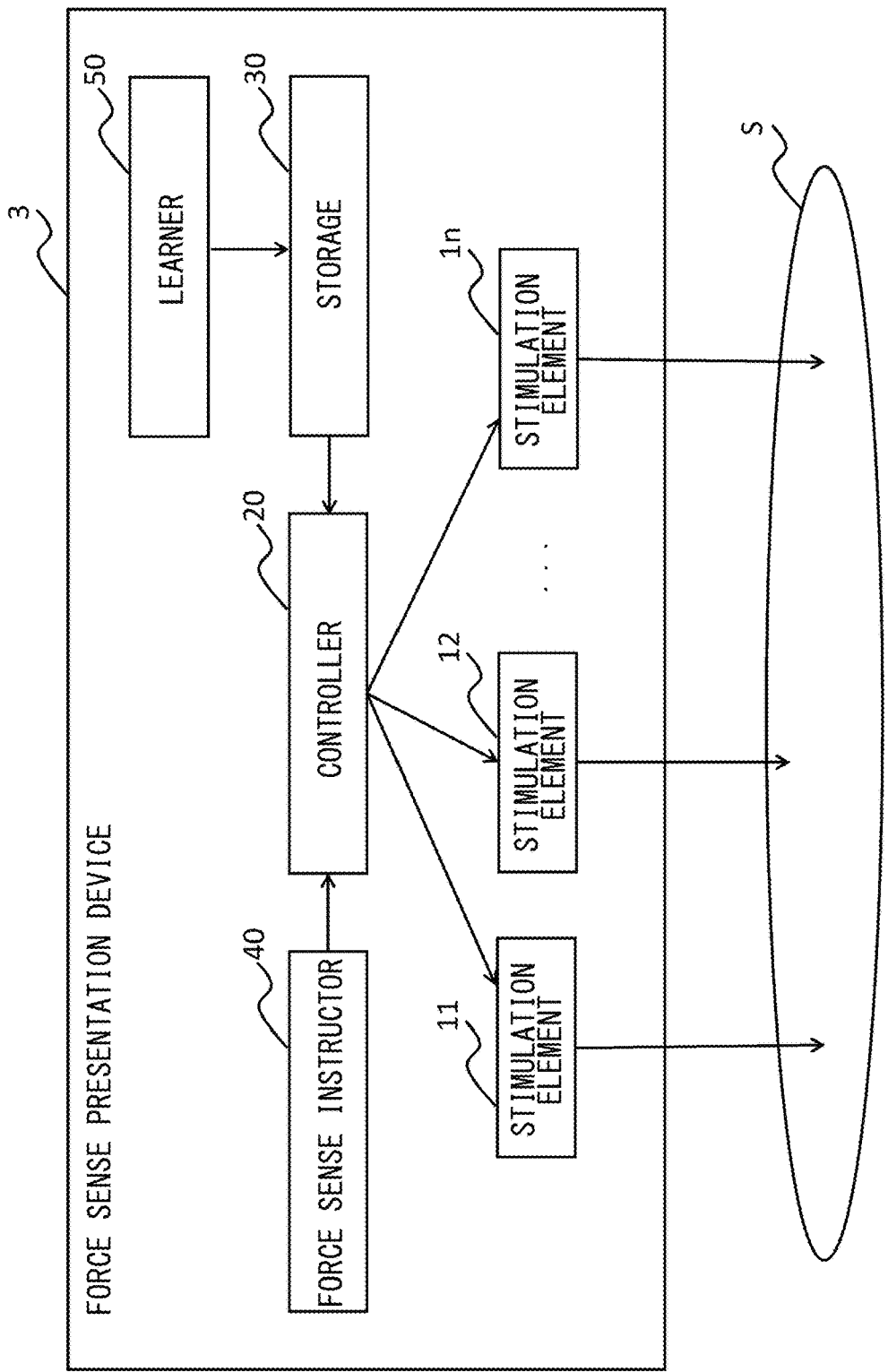
FIG. 3 is a functional block diagram of a force sense presentation device according to a fourth embodiment.

FIG. 3 illustrates functional blocks of a force sense presentation device 3 according to a fourth embodiment. The force sense presentation device 3 also presents a force sense by forming a dynamic quantity distribution on the skin S of the person. The force sense presentation device 3 includes the n stimulation elements 11, 12, ..., 1n, the controller 20, the storage 30, the force sense instructor 40, and a learner 50 (n is an integer of two or more). That is, the force sense presentation device 2 includes the learner 50 in addition to the configuration of the force sense presentation device 2 in FIG. 2. Since the configurations and the operations of the stimulation elements 11, 12, ..., 1n, the controller 20, and the force sense instructor 40 are the same as those of the force sense presentation device 2, the description thereof is omitted.

The learner 50 learns a relationship between the force sense presented to the person and the dynamic quantity distribution for generating the force sense. The presented force sense is the magnitude and direction of the force applied to the person, and the dynamic quantity distribution is estimated by simulation such as finite element analysis as described in the second embodiment. The learning may be performed by known AI. A specific method of the AI is not particularly limited, but for example, a neural network such as a convolutional neural network (CNN), a recurrent neural network (RNN), or a long short term memory (LSTM) network may be used, and in this case, different neural networks may be mixed for each calculation model after sharing an input layer. In the present embodiment, a large number of pairs of the presented force sense and the dynamic quantity distribution for generating the force sense are prepared, and the AI is caused to learn the pairs as learning data. Accordingly, when the desired force sense is input, the AI can calculate and output the dynamic quantity distribution for generating the force sense.

The storage 30 stores the learning result of the learner 50. When the target force sense is instructed from the force sense instructor 40, the controller 20 controls the stimulation elements 11, 12, ..., 1n to form the dynamic quantity distribution for generating the force sense on the skin S based on the learning result stored in the storage 30.

Fifth Embodiment

Figure 4:
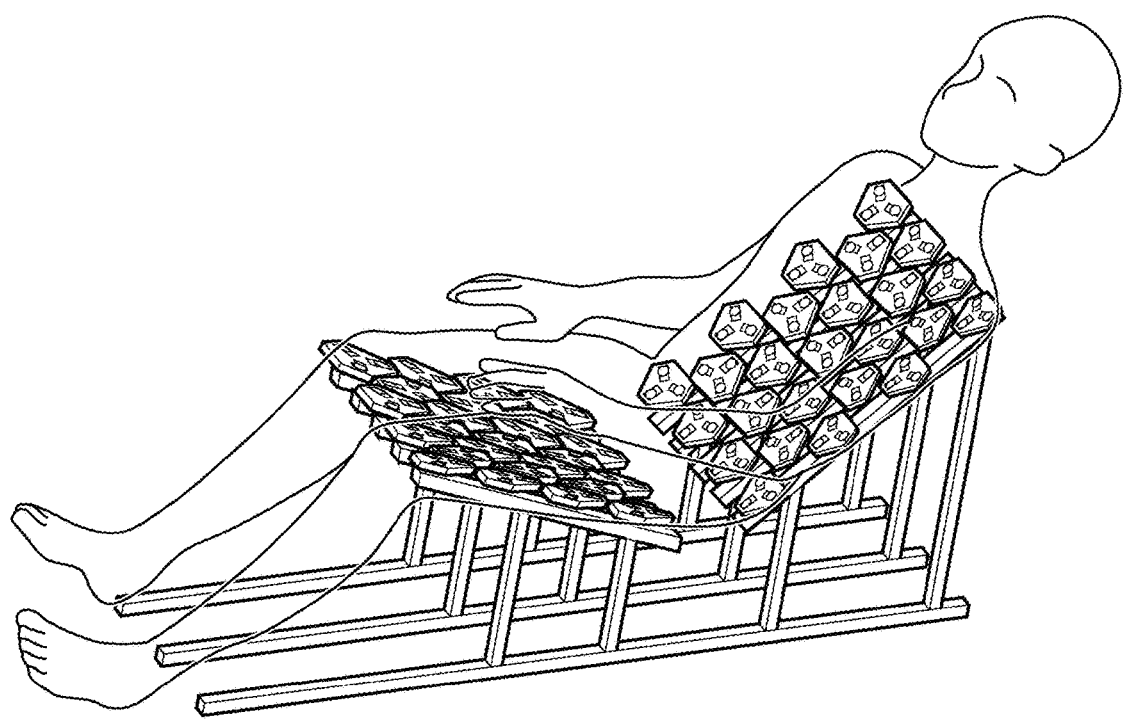
FIG. 4 is a schematic diagram of a force sense presentation device according to a fifth embodiment.

FIG. 4 is a schematic diagram of a force sense presentation device 4 according to a fifth embodiment. In the present embodiment, the stimulation elements 11, 12, ..., 1n present the force sense to a body part including the back or buttocks. The present inventor has found that by forming the dynamic quantity distribution particularly on the back or buttocks of the person, a force sense with a higher degree of freedom and excellent resolution can be realized in a large area of the body. Therefore, when the force sense is presented to the body part including the back or the buttocks, it is considered that a self-kinesthetic sense corresponding to a more complicated motion can be induced. Furthermore, the present embodiment can be realized by attaching the stimulation elements 11, 12, ..., 1n to an existing chair or the like. This is a great advantage in terms of size and cost.

According to the present embodiment, it is possible to present the self-kinesthetic sense corresponding to the complicated motion at low cost.

Sixth Embodiment

The dynamic quantity distribution may be a strain energy density distribution. The present inventor has found that the self-kinesthetic sense can be induced by forming, particularly, the strain energy density distribution among various dynamic quantity distributions. Recent studies have confirmed that the frequency of neuron firing of mechanoreceptors present in the skin of the person is proportional to the strain energy density. For example, a case where the person feels "receiving a strong force" corresponds to a case where the neuron firing of the mechanoreceptors occurs with high frequency. Therefore, in order to control the sense, it is considered that it is important to control the frequency of neuron firing. When considered in this way, it can be seen that the formation of the strain energy density distribution is particularly important even in the case of inducing the self-kinesthetic sense.

The controller 20 may control the stimulation elements 11, 12, . . . , 1n such that the strain energy density increases when the target force sense increases. The present inventor has found that the magnitude of the target force sense and the strain energy density often have a positive correlation. Therefore, it is considered that the self-kinesthetic sense can be induced by controlling the stimulation elements 11, 12, . . . , 1n such that the strain energy density increases when the target force sense increases.

Seventh Embodiment

The stimulation elements 11, 12, . . . , 1n may stimulate the skin by a rotational movement. At this time, the controller 20 may control the rotation angle and the rotation direction of the stimulation elements 11, 12, . . . , 1n.

In particular, in the case of a device that presents the force sense over a wide range of the back or buttocks as illustrated in FIG. 4, it is desirable that the stimulation applied to the skin is made not by a suction, an electrical stimulation, a temperature stimulation, a compression, or a translational movement along the shear direction of the skin, but by a rotational movement. The reason is as follows. First, in an aspect as in FIG. 4, it is assumed that the stimulation is applied to the skin via clothing. In this case, for example, a stimulation such as a suction, an electrical stimulation, or a temperature stimulation cannot be directly applied. Secondly, the stimulation caused by the compression causes the posture of the user on the chair to be shifted, and thus prevents the formation of an appropriate dynamic quantity distribution on the skin. In addition, thirdly, when it is desired to apply a stimulation by the translational movement along the shear direction of the skin it is necessary to convert the rotational movement of a motor serving as a power source into the translational movement. For this reason, the mechanism becomes complicated, and there arises a problem that it is difficult to apply the mechanism to the aspect in which the stimulation elements are densely arranged as illustrated in FIG. 4. In this regard, the stimulation by the rotational movement can be applied to the embodiment without the above-described problems.

The present inventor has experimentally confirmed that the dynamic quantity distribution for generating the self-kinesthetic sense can be formed on the skin by appropriately controlling the rotation angle and the rotation direction of the stimulation elements 11, 12, . . . , 1n. In this case, not only the rotation angle but also the time until the rotation angle is reached may be included in control parameters.

Note that, in the present embodiment, the purpose of the stimulation by the rotational movement is not to present the direction of the torsion itself as the force sense, but to excite the strain energy density near the stimulation point. When an experiment is actually performed, the rotation direction of the stimulation element alone is not perceived, and the force sense can be presented for the first time when a plurality of stimulation elements form a predetermined strain energy density distribution in cooperation.

According to the present embodiment, it is possible to generate the kinesthetic sense which the user feels when the user is actually performing a motion, for example, when the user rides on the vehicle, and it is also possible to generate, for example, the sense which the user feels as if the user is performing a motion relatively with respect to an object closely attached to the back, that is, the kinesthetic sense which the user feels when the user is not actually performing a motion.

The controller 20 may control the stimulation elements 11, 12, . . . , 1n such that the rotation angle of the stimulation elements 11, 12, . . . , 1n increases when the target force sense increases. The present inventor has found that the magnitude of the target force sense and the strain energy density often have a positive correlation. Furthermore, it is also found that the strain energy density and the rotation angles of the stimulation elements 11, 12, . . . , 1n also have a positive correlation. Therefore, by controlling the stimulation elements 11, 12, . . . , 1n such that the rotation angles of the stimulation elements 11, 12, . . . , 1n increase when the target force sense increases, it is possible to induce the self-kinesthetic sense.

Figure 5:
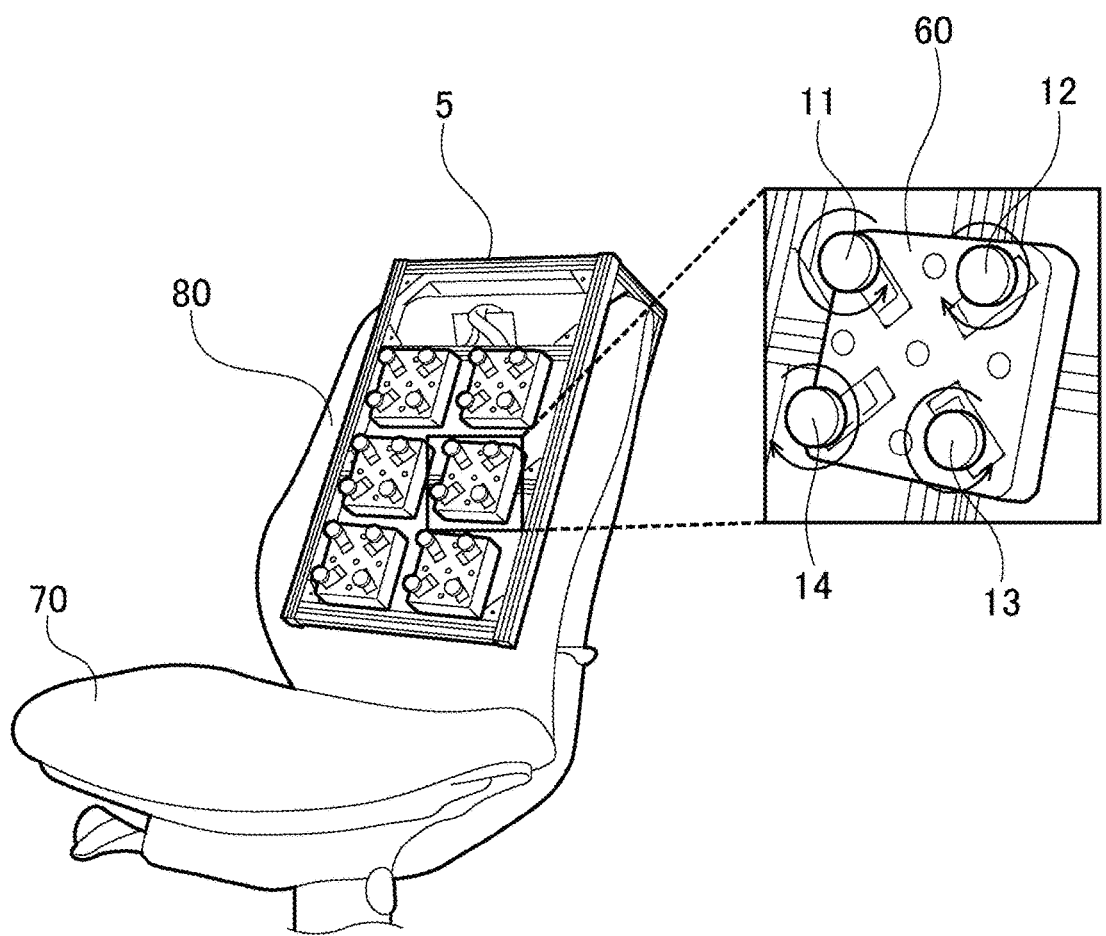
FIG. 5 is a photograph of a force sense presentation device according to a seventh embodiment.

FIG. 5 illustrates a photograph of a force sense presentation device 5 according to a seventh embodiment. The stimulation elements 11, 12, . . . , 1n includes a total of 24 stimulation elements. That is, n=24. A set including four stimulation elements among these stimulation elements is combined into one stimulation element unit. The stimulation element unit has a square shape, and the stimulation elements are arranged at four corners of the stimulation element unit. FIG. 5 illustrates a state in which the stimulation elements 11, 12, 13, and 14 are put together in the stimulation element unit 60. Six stimulation element units are arranged in an array of 2×3 on a backrest 80 of a chair 70. That is, the stimulation elements 11, 12, . . . , and 124 are arranged in an array of 4×6 on the backrest 80 of the chair 70. The interval between adjacent stimulation elements is 55 mm. This is because it has been experimentally verified that the interval enabling the generation of a spatially continuous force sense is about 55 mm while the two-point discrimination threshold at the back of a person is about 40 mm. Since the backrest 80 of the chair 70 draws a gentle curved surface instead of a flat surface, a mount is adjusted such that the right and left stimulation elements of the backrest 80 are inclined toward the center.

Each of the stimulation elements 11, 12, . . . , 124 has a disk shape with a diameter of 20 mm and a thickness of 5 mm. When the stimulation elements 11, 12, . . . , and 124 are excessively hard, the stimulation elements do not conform to the body, and a pain due to the contact of the edges of the stimulation elements 11, 12, . . . , and 124 or a slippage between the stimulation elements 11, 12, . . . , and 124 and clothing easily occurs. Conversely, when the stimulation elements 11, 12, . . . , and 124 are excessively soft, it becomes difficult to transmit the rotational force. In view of these features, a suitable chloroprene rubber sponge is used as the material of the stimulation elements 11, 12, . . . , 124.

A small servomotor is used as an actuator for rotating the stimulation elements 11, 12, . . . , and 124. The maximum torque that the servomotor can output is 0.2 N·m, which is sufficient to deform the skin on the back. The stimulation elements 11, 12, . . . , and 124 are controlled to rotate at a rotation angle of 30 degrees and a rotation speed of 60 degrees/second.

Figure 6:
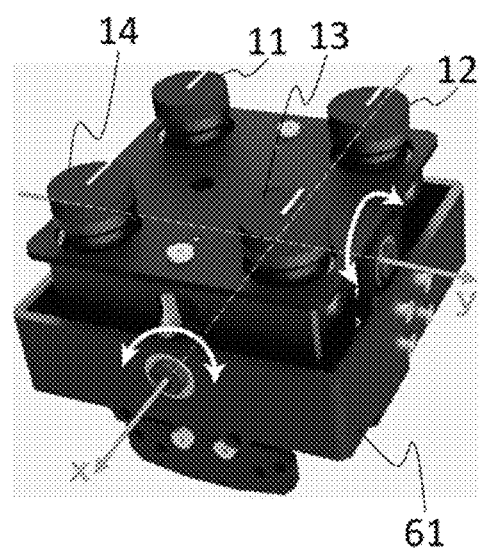
FIG. 6 is a photograph of a stimulation element unit.

In certain embodiments, the above-described stimulation element unit may include a two-axis gimbal. FIG. 6 illustrates a photograph of a stimulation element unit 61 including a two-axis gimbal having an x-axis and a y-axis orthogonal to each other. As illustrated, the stimulation element unit 61 can freely rotate independently about the x-axis and the y-axis.

According to the present embodiment, the stimulation element unit 61 can rotate along the unevenness of the body, and thus a fit to the body surface is improved, and the transmission efficiency of the rotational stimulation can be improved.

Eighth Embodiment

The dynamic quantity distribution may be as follows in addition to the strain energy density distribution. For example, the dynamic quantity distribution n is a distribution of a strain, and this strain may be a main strain or an equivalent strain. Alternatively, the dynamic quantity distribution is a distribution of a force, and this force may be a shear force or a vertical resistance force. Furthermore, the dynamic quantity distribution is a distribution of a stress, and this stress may be either a pressure, a main stress, or a Mises stress.

Ninth Embodiment

In FIGS. 1 to 3, an interval between the adjacent stimulation elements may be such an interval that the force senses presented by the adjacent stimulation element have an overlapping range. The present inventor has found that a spatially continuous force sense can be more reliably presented by providing the interval between adjacent stimulation elements in this manner.

Tenth Embodiment

Figure 7:
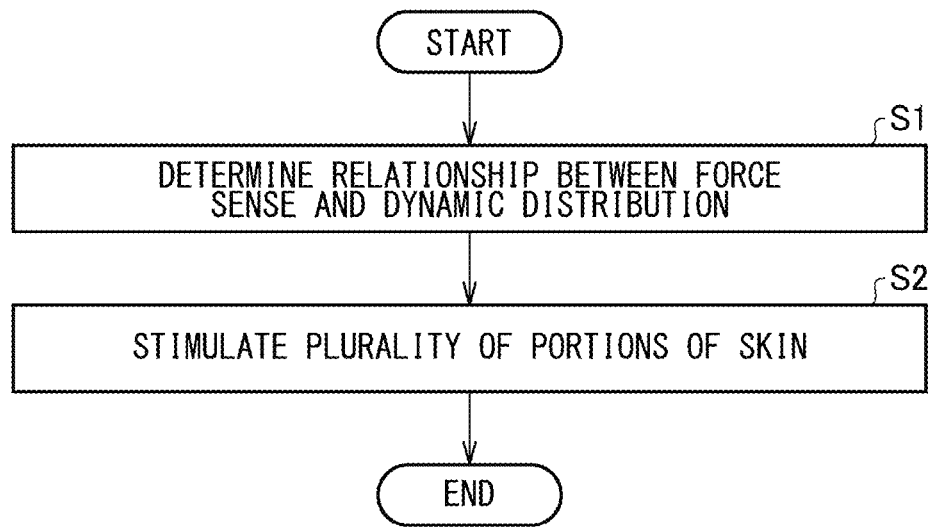
FIG. 7 is a flowchart of a force sense presentation method according to a tenth embodiment.

FIG. 7 illustrates a flow of a force sense presentation method according to a tenth embodiment. This force sense presentation method includes step S1 of determining a relationship between a force sense to be presented and a dynamic quantity distribution and step S2 of stimulating a plurality of portions of the skin. An interval between adjacent portions of the skin to be stimulated is an interval enabling generation of a spatially continuous force sense. The force sense generates a self-kinesthetic sense of the person.

In step S1, the present force sense presentation method determines the relationship between a force sense to be presented and a dynamic quantity distribution for generating the force sense. The determination of the relationship between the force sense to be presented and the dynamic quantity distribution for generating the force sense may be based on a database or the like stored in a storage means or the like, may be based on an input from the outside, or may be based on learning such as machine learning.

In step S2, the present force sense presentation method stimulates a plurality of portions of the skin to form the dynamic quantity distribution for generating the force sense on the skin. A stimulating method may be a kinematic method such as rotational movement, pulling in a shear direction, a compression, and a suction. The stimulation may be applied by each one which can individually present a force sense. Alternatively, the stimulation may be applied by a plurality of members which form a predetermined dynamic quantity distribution in cooperation and then only are able to present a force sense.

The interval between adjacent portions of the skin to be stimulated may be, for example, an interval such that the force senses presented at the adjacent portions have an overlapping range. Alternatively, the interval between the adjacent portions of the skin to be stimulated may be an interval that is within a two-point discrimination threshold in the region of the skin.

The self-kinesthetic sense generated by the force sense may be a kinesthetic sense which the person feels when the person is actually performing a motion, or may be a kinesthetic sense which the person feels when the person is not actually performing a motion.

The dynamic quantity distribution may be a strain energy density distribution.

According to the present embodiment, it is possible to present the force sense which causes the person to feel as if the person is performing a motion by stimulating the skin of the person.

Eleventh Embodiment

Figure 8:
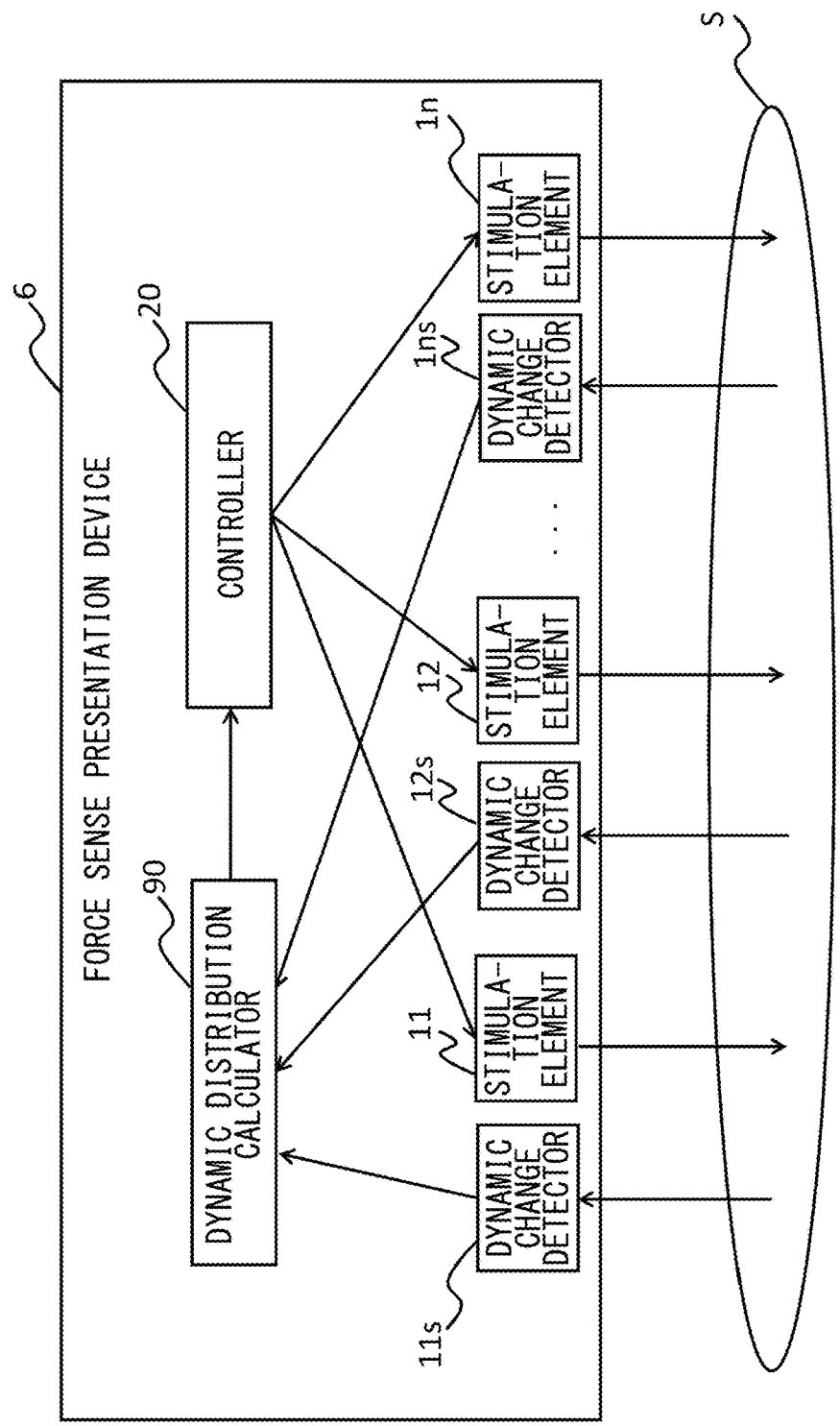
FIG. 8 is a functional block diagram of a force sense presentation device according to an eleventh embodiment.

FIG. 8 illustrates functional blocks of a force sense presentation device 6 according to an eleventh embodiment. The force sense presentation device 6 measures the dynamic quantity distribution of the skin S caused by the motion of the person, and forms the dynamic quantity distribution on the skin S of the person to present the force sense. The force sense presentation device 6 includes the n stimulation elements 11, 12, . . . , 1*n*, n dynamic change detectors 11*s*, 12*s*, . . . , 1*ns*, the controller 20, and a dynamic quantity distribution calculator 90 (n is an integer of two or more). That is, the force sense presentation device 6 includes the n dynamic change detectors 11*s*, 12*s*, . . . , 1*ns* in addition to the configuration of the force sense presentation device 1 in FIG. 1. Detailed description of configurations common to the force sense presentation device 1 other than the dynamic change detectors 11*s*, 12*s*, . . . , 1*ns* is omitted.

Each of the dynamic change detectors 11*s*, 12*s*, . . . , 1*ns* detects the dynamic change of the skin S of the person caused by the motion of the person, and transmits the detection result to the dynamic quantity distribution calculator 90.

The dynamic quantity distribution calculator 90 calculates the dynamic quantity distribution of the skin for generating the dynamic change from the dynamic change of the skin of the person detected by the dynamic change detectors 11*s*, 12*s*, . . . , 1*ns*, and transmits the calculation result to the controller. The dynamic quantity distribution may be a strain energy density distribution, a strain distribution, a force distribution, a stress distribution, or the like.

The controller 20 reproduces the dynamic quantity distribution of the skin received from the dynamic quantity distribution calculator 90 for each stimulation element. Alternatively, the controller 20 controls the stimulation elements 11, 12, . . . , 1*n* to form the dynamic quantity distribution calculated by the dynamic quantity distribution calculator 90 on the skin. An interval between the adjacent stimulation elements is an interval enabling presentation of a spatially continuous force sense. The force sense generates the self-kinesthetic sense of the person.

A specific use example of the force sense presentation device 6 is, for example, as follows. The force sense presentation device 6 is configured such that the stimulation element is provided in a backrest or a cushion. The user brings the force sense presentation device 6 for a drive, an amusement park, or the like. The user sets the force sense presentation device 6 on a seat of an automobile or a playing tool, so that the dynamic quantity distribution of the back or buttocks of the user is calculated while capturing a video. After returning home, the user is presented with the force sense from the force sense presentation device 6 together with the video, so that the user can recall the experience with a high sense of reality.

In a case where the stimulation element stimulates the skin by the rotational movement, a relationship between the dynamic change of the skin and the force is obtained by measuring the rotation angle at the time of rotation and the current value at that time, so that the hardness of the skin can also be measured, for example. Furthermore, by arranging these stimulation elements, for example, the distribution of elasticity of the skin can be measured. Alternatively, when a stimulation element contactor exerts pressure perpendicularly to the surface of the skin, the current value at that time is measured so that the distribution of the pressure and the elasticity of the skin can be obtained.

According to the present embodiment, it is possible to detect the dynamic change of the skin caused by the actual motion of the person by using the dynamic change detector, and then calculate the dynamic quantity distribution of the skin for generating the dynamic change. Accordingly, it is possible to give a force sense for reproducing the sense of the actual motion.

Twelfth Embodiment

Figure 9:
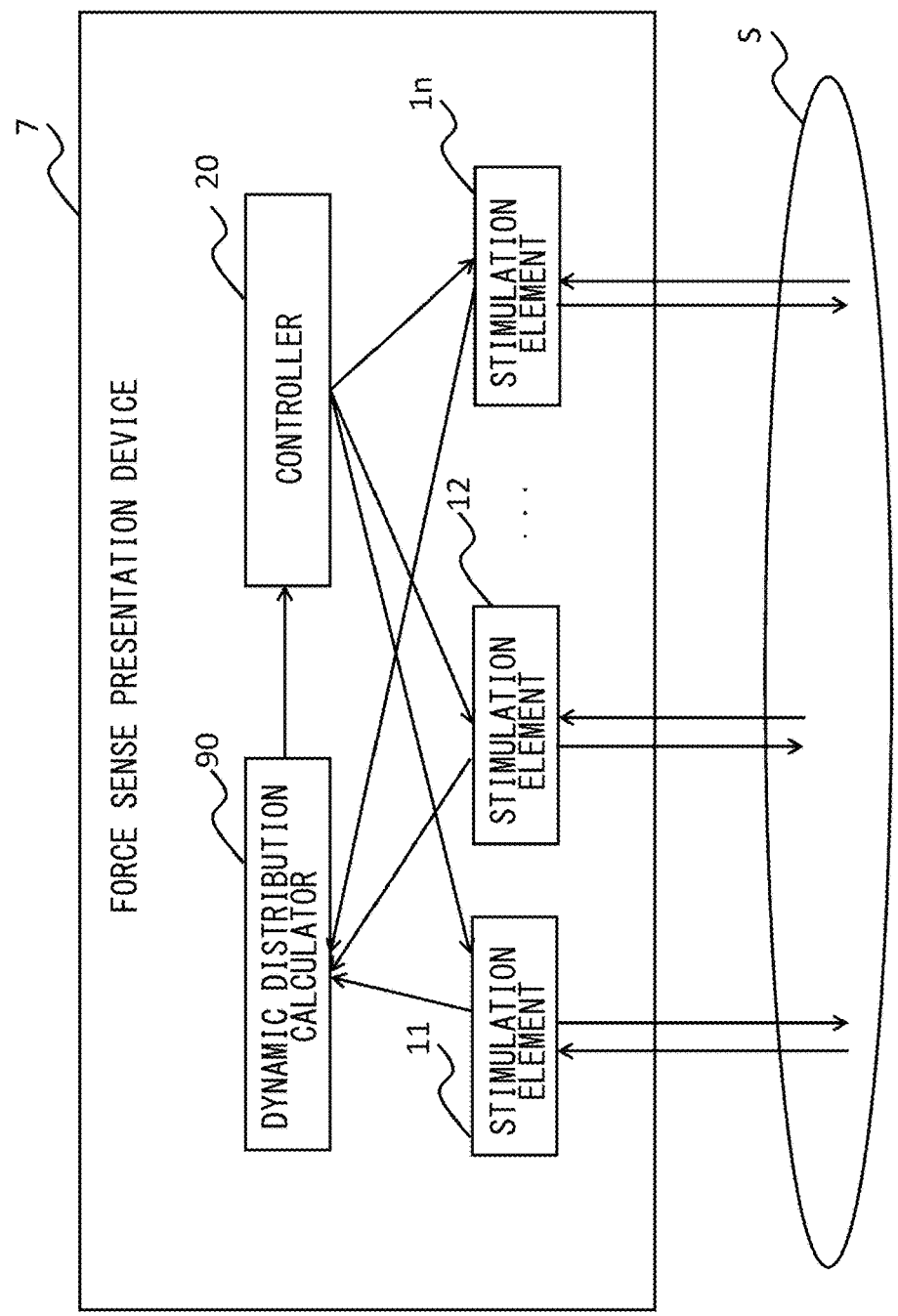
FIG. 9 is a functional block diagram of a force sense presentation device according to a twelfth embodiment.

FIG. 9 illustrates functional blocks of a force sense presentation device 7 according to a twelfth embodiment. The force sense presentation device 7 measures the dynamic quantity distribution of the skin S caused by the motion of the person, and forms the dynamic quantity distribution on the skin S of the person to present the force sense. The force sense presentation device 7 includes the n stimulation elements 11, 12, . . . , 1$n$, the controller 20, and the dynamic quantity distribution calculator 90 (n is an integer of two or more). The stimulation elements 11, 12, . . . , 1$n$ of the force sense presentation device 7 include the above-described dynamic change detector. As described below, the stimulation element of the present embodiment functions as a means of stimulating the skin S, and also functions as a detection means (sensor) of detecting the dynamic change of skin S accompanying the actual motion of the person.

In this embodiment, each of the stimulation elements 11, 12, . . . , 1$n$ includes a dynamic change detector. That is, the stimulation elements 11, 12, . . . , 1$n$ detect the dynamic change of the skin S of the person caused by the motion of the person and stimulate the skin of the person. In other words, the stimulation element also serves as a dynamic change detector. Therefore, the stimulation elements 11, 12, . . . , 1$n$ function as a means of stimulating the skin S as in the above-described embodiment, and also function as a detection means (sensor) of detecting a dynamic change of the skin S accompanying the actual motion of the person. The dynamic change of the skin S detected by the stimulation elements 11, 12, . . . , 1$n$ depends on a method by which the stimulation elements 11, 12, . . . , 1$n$ stimulate the skin S. For example, in a case where the stimulation elements 11, 12, . . . , 1$n$ stimulate the skin S by the rotational movement, the stimulation elements 11, 12, . . . , 1$n$ detect the rotation of the skin S as the dynamic change of the skin S accompanying the motion of the person. Alternatively, in a case where the stimulation elements 11, 12, . . . , 1$n$ stimulate the skin S by pulling the skin S in the shear direction, the stimulation elements 11, 12, . . . , 1$n$ detect the stretch or contraction of the skin S in the shear direction as the dynamic change of the skin S accompanying the motion of the person. Alternatively, in a case where the stimulation elements 11, 12, . . . , 1$n$ stimulate the skin S by a compression or a suction, the stimulation elements 11, 12, . . . , 1$n$ detect the distortion of the skin S caused by the compression or suction of the skin S as the dynamic change of the skin S accompanying the motion of the person, and the controller 20 stores the result.

The principle on which the stimulation elements 11, 12, . . . , 1$n$ detect the dynamic change of the skin S caused by the motion of the person is as follows. It is assumed that the stimulation elements 11, 12, . . . , 1$n$ of the force sense presentation device according to the above-described embodiments stimulate the skin S to form a dynamic quantity distribution that induces a certain self-kinesthetic sense. At this time, in a case where the person wearing the force sense presentation device is actually performing the motion, it is considered that each of the stimulation elements 11, 12, . . . , 1$n$ receives an action in a direction opposite to the stimulation to be applied to the skin S, or generates a counter electromotive force due to the action in the opposite direction. When measuring the action in the opposite direction and the counter electromotive force, the stimulation elements 11, 12, . . . , 1$n$ can detect the dynamic change of the skin S caused by the actual motion of the person.

According to the present embodiment, the stimulation element also serves as the dynamic change detector, and thus the force sense presentation device can be achieved compactly and inexpensively with a small number of components.

Thirteenth Embodiment

Figure 10:
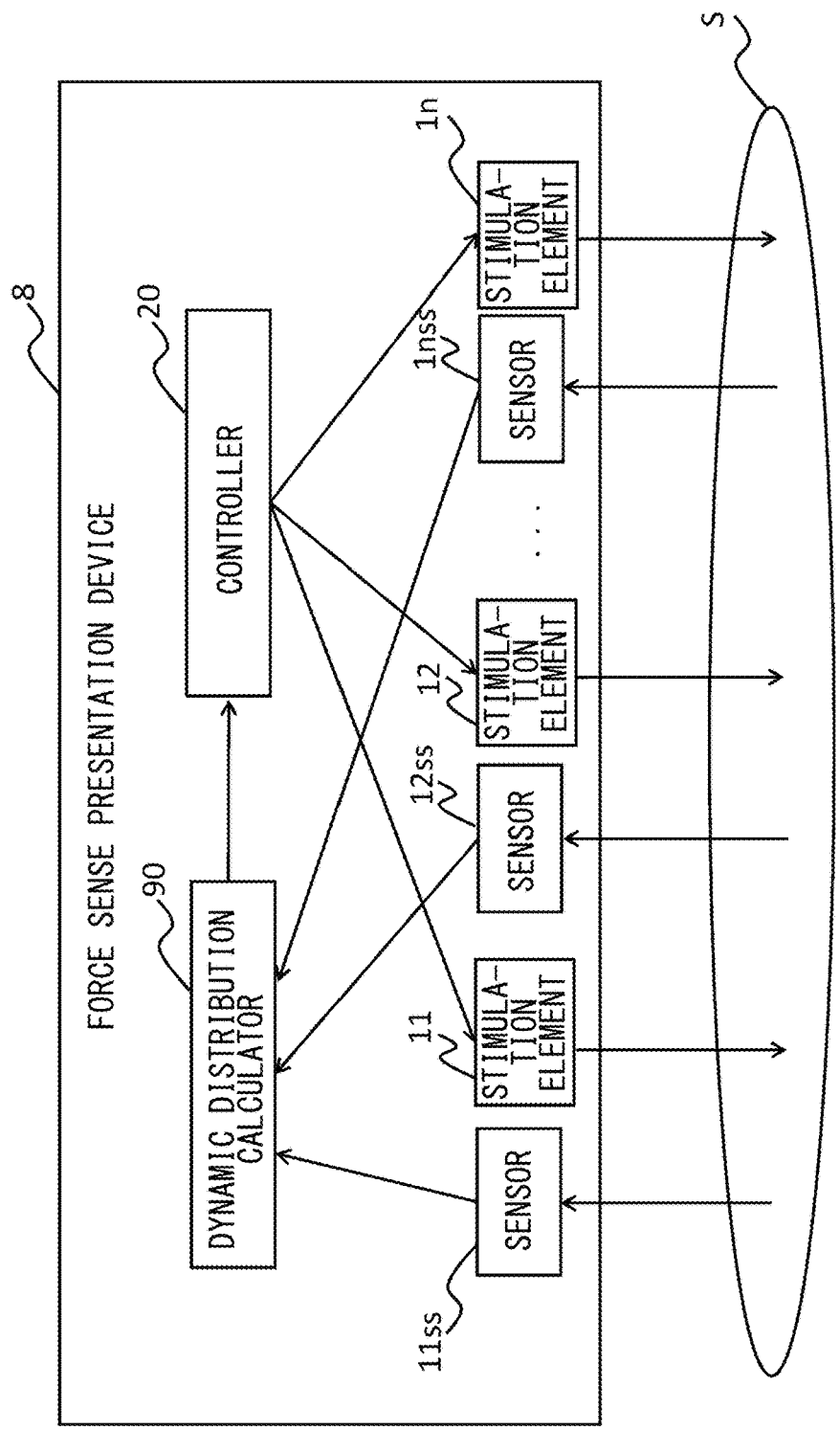
FIG. 10 is a functional block diagram of a force sense presentation device according to a thirteenth embodiment.

FIG. 10 illustrates functional blocks of a force sense presentation device 8 according to a thirteenth embodiment. The force sense presentation device 8 also measures the dynamic quantity distribution of the skin S caused by the motion of the person, and forms the dynamic quantity distribution on the skin S of the person to present the force sense. The force sense presentation device 8 includes the n stimulation elements 11, 12, . . . , 1$n$, n sensors 11$ss$, 12$ss$, . . . , 1$nss$, the controller 20, and the dynamic quantity distribution calculator 90 (n is an integer of two or more).

Each of the sensors 11$ss$, 12$ss$, . . . , 1$nss$ detects the dynamic change of the skin S of the person caused by the motion of the person, and transmits the detection result to the dynamic quantity distribution calculator 90.

The sensors 11$ss$, 12$ss$, . . . , 1$nss$ may be any suitable sensor, such as a speed sensor, an acceleration sensor, or a pressure sensor, capable of detecting the dynamic change of the skin caused by the motion of the person. In the force sense presentation device 7 of FIG. 9, the stimulation element also serves as the dynamic change detector. On the other hand, the dynamic change detector of the force sense presentation device 8 is realized by a sensor provided independently of the stimulation element unit.

According to the present embodiment, the dynamic change of the skin can be detected by using any suitable sensor, and thus it is possible to realize a high-performance force sense presentation device with higher accuracy.

Fourteenth Embodiment

Figure 11:
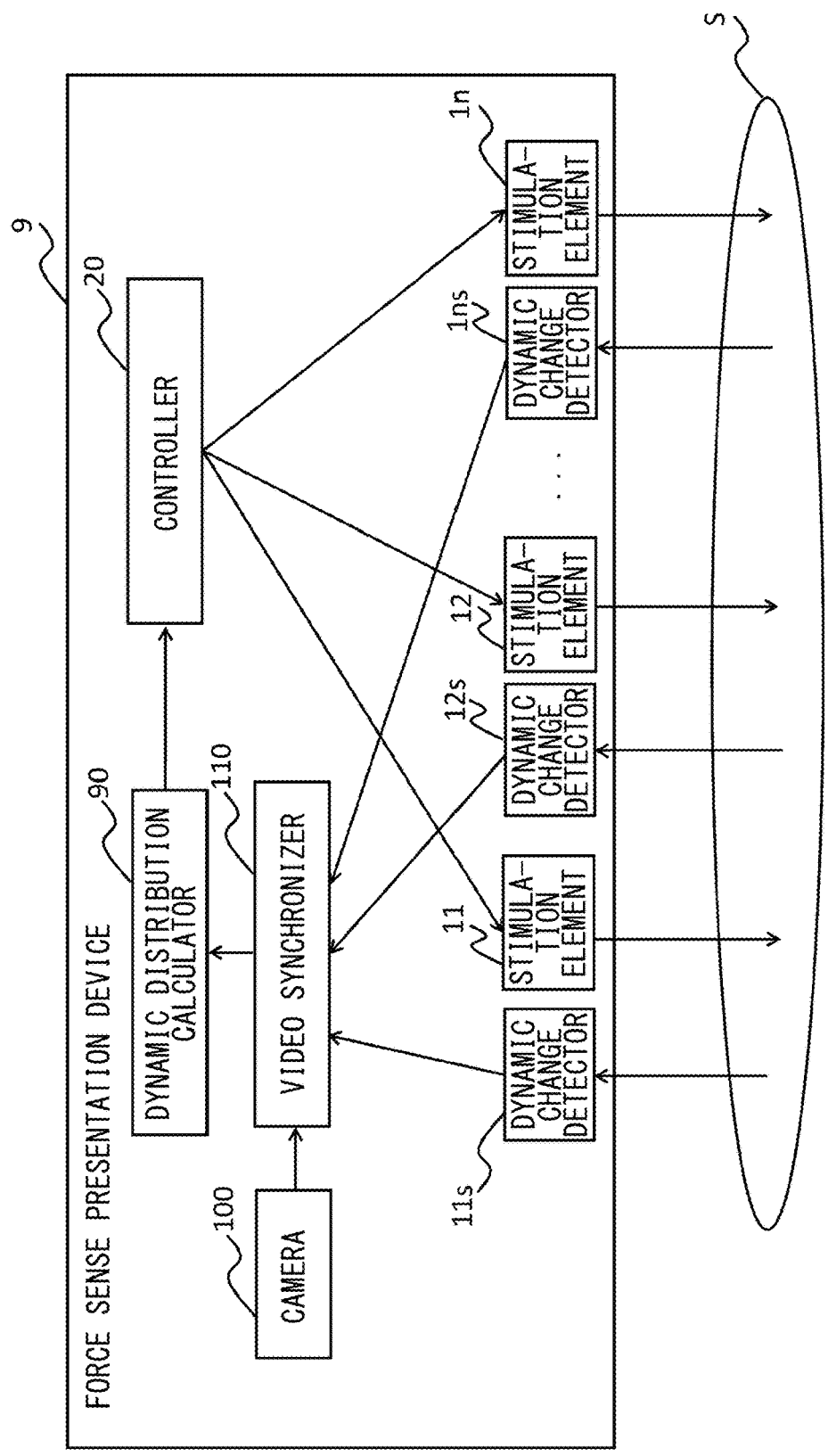
FIG. 11 is a functional block diagram of a force sense presentation device according to a fourteenth embodiment.

FIG. 11 illustrates functional blocks of a force sense presentation device 9 according to a fourteenth embodiment.

The force sense presentation device 9 also measures the dynamic quantity distribution of the skin S caused by the motion of the person, and forms the dynamic quantity distribution on the skin S of the person to present the force sense. The force sense presentation device 8 includes the n stimulation elements 11, 12, . . . , 1n, the n dynamic change detectors 11s, 12s, . . . , 1ns, the controller 20, the dynamic quantity distribution calculator 90, a camera 100, and a video synchronizer 110 (n is an integer of two or more). That is, the force sense presentation device 9 includes the camera 100 and the video synchronizer 110 in addition to the configuration of the force sense presentation device 6 in FIG. 8. Detailed description of configurations common to the force sense presentation device 6 other than the camera 100 and the video synchronizer 110 is omitted.

The dynamic change detectors 11s, 12s, . . . , 1ns detect the dynamic change of the skin S caused by the motion of the person, and transmit the detection result to the video synchronizer 110. The camera 100 captures a subjective video viewed from a person who operates the camera, that is, a video captured from a viewpoint of the person, and transmits the video to the video synchronizer 110. The video synchronizer 110 calculates a relationship between the dynamic change of the skin of the person and the change of the subjective video. That is, the video synchronizer 110 calculates, when a certain change occurs in the subjective video, what kind of dynamic change of the skin of the person occurs due to the change. For example, the situation includes what kind of dynamic change of the skin occurs when the person performs an acceleration motion with respect to a surrounding scene in the subjective video and what kind of dynamic change of the skin occurs when the person inclines with respect to the surrounding scene in the subjective video. The video synchronizer 110 transmits the calculated relationship between the dynamic change of the skin of the person and the change of the subjective video to the dynamic quantity distribution calculator 90.

On the basis of the relationship between the dynamic change of the skin of the person and the change of the subjective video calculated by the video synchronizer 110, the dynamic quantity distribution calculator 90 calculates the dynamic quantity distribution of the skin for generating the dynamic change from the dynamic change of the skin of the person when the subjective video changes. Accordingly, the force sense presentation device 7 presents the force sense for generating, when the video viewed from the viewpoint of the person operating the camera changes, the self-kinesthetic sense felt by the person.

According to the present embodiment, it is possible to present more realistic self-kinesthetic sense synchronized with the video.

Fifteenth Embodiment

Figure 12:
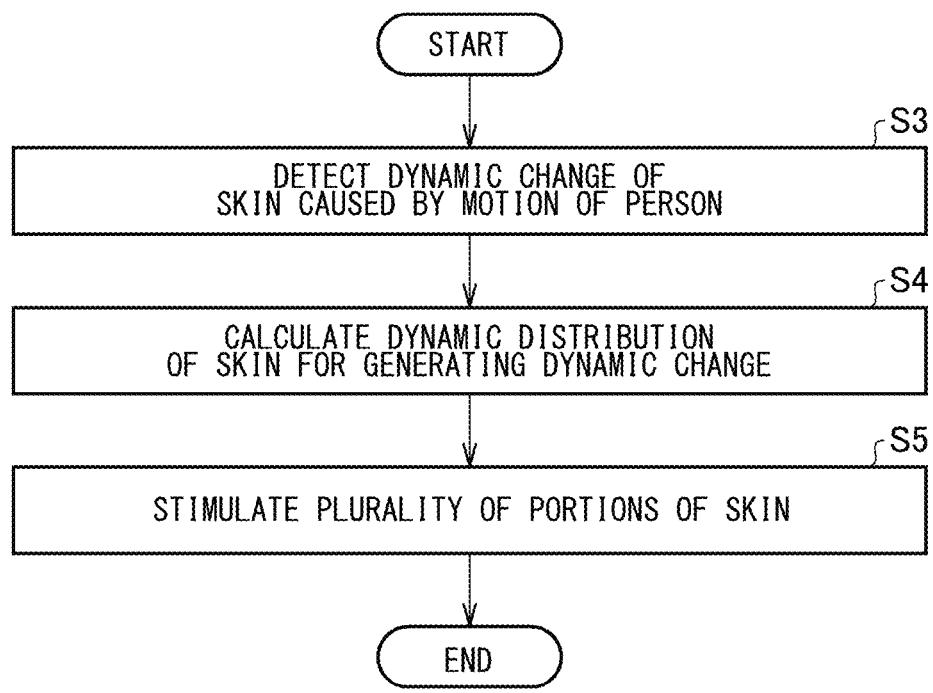
FIG. 12 is a flowchart of a force sense presentation method according to a fifteenth embodiment.

FIG. 12 illustrates a flow of a force sense presentation method according to a fifteenth embodiment. This force sense presentation method includes step S3 of detecting the dynamic change of the skin caused by the motion of the person, step S4 of calculating the dynamic quantity distribution of the skin for generating the dynamic change, and step S5 of stimulating the plurality of portions of the skin. An interval between adjacent portions of the skin to be stimulated is an interval enabling generation of a spatially continuous force sense. The force sense generates a self-kinesthetic sense of the person.

In step S3, the present force sense presentation method detects the dynamic change of the skin of the person caused by the motion of the person by using a sensor or the like. The dynamic change of the skin caused by the motion may be the rotation of the skin, the stretch or contraction of the skin in the shear direction, the distortion of the skin due to compression or suction, or the like.

In step S4, the present force sense presentation method calculates, from the dynamic change of the skin of the person detected in step S3, the dynamic quantity distribution of the skin for generating the dynamic change.

In step S5, the present force sense presentation method reproduces the dynamic change detected in step 3. Alternatively, in step S5, the present force sense presentation method stimulates a plurality of portions of the skin to form the dynamic quantity distribution calculated in step S4 on the skin.

According to the present embodiment, it is possible to detect the dynamic change of the skin caused by the actual motion of the person and calculate the dynamic quantity distribution of the skin for generating the dynamic change. Accordingly, it is possible to give a force sense for reproducing the sense of the actual motion.

Sixteenth Embodiment

Figure 13:
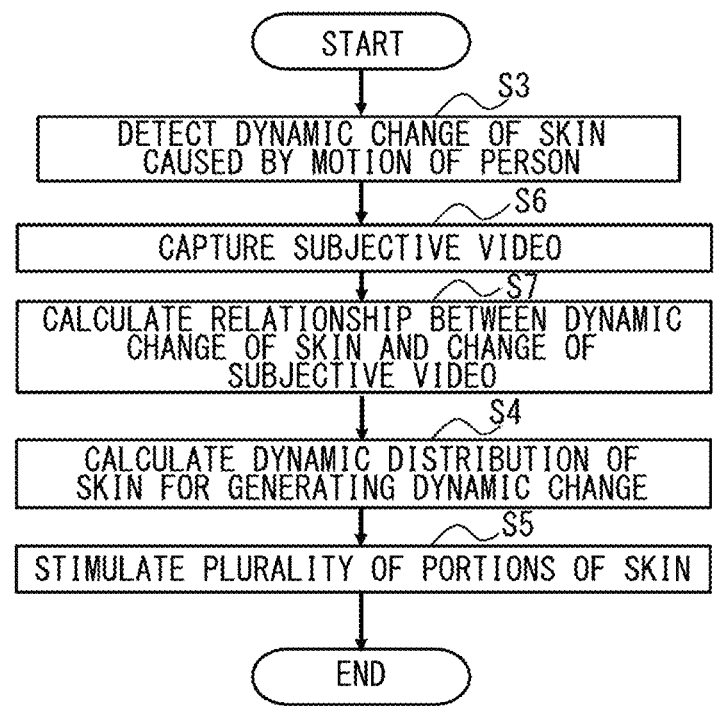
FIG. 13 is a flowchart of a force sense presentation method according to a sixteenth embodiment.

FIG. 13 illustrates a flow of a force sense presentation method according to a sixteenth embodiment. This force sense presentation method includes step S3 of detecting the dynamic change of the skin caused by the motion of the person, step S6 of capturing the subjective video, step S7 of calculating the relationship between the dynamic change of the skin and the change of the subjective video, step S4 of calculating the dynamic quantity distribution of the skin for generating the dynamic change, and step S5 of stimulating the plurality of portions of the skin. That is, the method includes step S6 and step S7 in addition to the method in FIG. 12. Detailed description of configurations common to the method of FIG. 12 in steps S6 and S7 is omitted.

In step S3, the present force sense presentation method detects the dynamic change of the skin of the person caused by the motion of the person by using a sensor or the like.

In step S6, in the present force sense presentation method, a camera or the like is used to capture the subjective video viewed from the person operating the camera, that is, the video captured from the viewpoint of the person.

In step S7, the present force sense presentation method calculates the relationship between the dynamic change of the skin of the person captured by the camera and the change of the subjective video. That is, when a certain change occurs in the subjective video, what kind of dynamic change the skin of the person occurs due to the change is calculated by the processing of step S7. For example, the situation includes what kind of dynamic change of the skin occurs when the person performs an acceleration motion with respect to a surrounding scene in the subjective video and what kind of dynamic change of the skin occurs when the person inclines with respect to the surrounding scene in the subjective video.

In step S4, in the present force sense presentation method, on the basis of the calculated relationship between the dynamic change of the skin of the person and the change of the subjective video, the dynamic quantity distribution of the skin for generating the dynamic change is calculated from the dynamic change of the skin of the person when the subjective video changes.

In step S5, the present force sense presentation method stimulates the plurality of portions of the skin to form the dynamic quantity distribution calculated in step S4 on the skin of the person.

According to the present embodiment, it is possible to present more realistic self-kinesthetic sense synchronized with the video.

Seventeenth Embodiment

In the above-described embodiments, an example has been described in which the stimulation element stimulates a body part, such as the back and the buttocks, with relatively little movement. However, the present invention is not limited thereto, and the stimulation element may stimulate a body part, such as the hand or the foot, with large movement. At this time, the controller may control the stimulation element to form, on the skin, a dynamic quantity distribution corresponding to stretch of the skin generated when the body part is moved.

According to the present embodiment, for example, it is possible to give the user being seated on a chair and is stationary the self-kinesthetic sense as if the user is moving his/her limbs.

Eighteenth Embodiment

The stimulation element may give a person wearing the stimulation element a sense accompanying a motion such as being touched, traced, or grasped or a small animal running around the body or accompanying a spatial flow. At this time, the rotational stimulation element in the stimulation element unit is controlled as follows. That is, first, a stimulation point for stimulating the person wearing the stimulation element is provided, and the stimulation point is moved on the skin of the person. Furthermore, each of the stimulation elements is controlled such that the rotation angle increases when the stimulation element approaches the stimulation point, and the rotation angle decreases when the stimulation element is farther from the stimulation point. Specifically, the controller moves the stimulation point for stimulating on the skin of the person and controls the stimulation element such that the rotation angle of the stimulation element increases when a distance from the stimulation point decreases. By performing such control, it is possible to give the person a kinesthetic sense as if the stimulation point smoothly moves or flows. By appropriately defining a relationship between the distance between the stimulation point and the stimulation element and the rotation angle of the stimulation element, it is possible to give the person the sense, such as being touched, traced, or grasped or a small animal running around on the body, accompanying a desired spatial flow.

In the above, the embodiments of this invention have been described in detail. The above-described embodiments have been described merely for exemplary purposes, and various modifications and changes can be made within the scope of the claims of the present invention. It will be understood by those skilled in the art that such modifications and changes are within the scope of the claims of the present invention. Therefore, the description and drawings in this specification should be treated as illustrative rather than restrictive.

Modifications

Hereinafter, modifications are described. In the drawings and descriptions of the modifications, the same reference numerals are given to the same or equivalent components and members as those in the embodiments. The description overlapping with the embodiments is omitted as appropriate, and the configuration different from the first embodiment is mainly described.

In the embodiments, the stimulation element unit has a square shape including two stimulation elements in a horizontal direction and two stimulation elements in a vertical direction. However, the present invention is not limited thereto, and for example, the stimulation element unit may include three stimulation elements in the horizontal direction and three stimulation elements in the vertical direction, or may include four stimulation elements in the horizontal direction and four stimulation elements in the vertical direction. Alternatively, the stimulation element unit may have a rectangular shape including two stimulation elements in the horizontal direction and three stimulation elements in the vertical direction. According to this modification, the degree of freedom of the configuration can be increased.

In the embodiments, an example in which the force sense presentation device is used alone has been described. However, the present invention is not limited thereto, and a plurality of force sense presentation devices may be used in combination at different portions of the body. In addition, a head-mounted display (HMD) or the like on which an image is displayed may be used in combination with the force sense presentation device. Accordingly, it is possible to give a self-kinesthetic sense with a higher sense of reality.

Each of these modifications has the same function and effect as those of the embodiments.

Any combination of the above-described embodiments and modifications is also useful as an embodiment of the present invention. The new embodiment made by the combination has the effects of the combined embodiment and modifications.

INDUSTRIAL APPLICABILITY

The present invention is applicable to the force sense presentation device and the force sense presentation method for presenting the force sense by stimulating the skin of the person.

REFERENCE SIGNS LIST

1 force sense presentation device, 2 force sense presentation device, 3 force sense presentation device, 4 force sense presentation device, 5 force sense presentation device, 6 force sense presentation device, 7 force sense presentation device, 8 force sense presentation device, 9 force sense presentation device, 11 stimulation element, 12 stimulation element, 13 stimulation element, 14 stimulation element, 1n stimulation element, 20 controller, 30 storage, 40 force sense instructor, 50 learner, 60 stimulation element unit, 61 stimulation element unit, 70 chair, 80 backrest, 90 dynamic quantity distribution calculator, 100 camera, 110 video synchronizer, S skin, S1 step of determining relationship between force sense and dynamic quantity distribution, S2 step of stimulating plurality of portions of skin, S3 step of detecting dynamic change of skin caused by motion of person, S4 step of calculating dynamic quantity distribution of skin for generating dynamic change, S5 step of stimulating plurality of portions of skin, S6 step of capturing subjective video, S7 step of calculating relationship between dynamic change of skin and change of subjective video

The invention claimed is:

1. A force sense presentation device that presents a force sense by forming a dynamic quantity distribution on a skin of a person, the device comprising:
   a plurality of stimulation elements; and a controller,
   wherein each of the plurality of stimulation elements stimulates the skin of the person,
   wherein the controller controls the plurality of stimulation elements such that a dynamic quantity distribution for generating a target force sense is formed on the skin,
   wherein an interval between the adjacent stimulation elements is an interval enabling presentation of a spatially continuous force sense,
   wherein the force sense generates a self-kinesthetic sense of the person, and
   wherein the interval between the adjacent stimulation elements is such an interval that the force senses presented by the adjacent stimulation elements have an overlapping range.

2. The force sense presentation device according to claim 1, the device further comprising:
   a storage structured to store a relationship between the target force sense and the dynamic quantity distribution for generating the force sense; and a force sense instructor, wherein
   when the target force sense is instructed from the force sense instructor, the controller controls the stimulation elements such that the dynamic quantity distribution for generating the force sense stored in the storage is formed on the skin.

3. The force sense presentation device according to claim 2, further comprising:
   a learner structured to learn a relationship between the presented force sense and the dynamic quantity distribution for generating the force sense.

4. The force sense presentation device according to claim 1, wherein the controller calculates the dynamic quantity distribution for generating the target force sense, and controls the plurality of stimulation elements to stimulate the skin to form the dynamic quantity distribution.

5. The force sense presentation device according to claim 1, wherein the stimulation element presents the force sense to a body part including a back or buttocks.

6. The force sense presentation device according to claim 1, wherein the stimulation element presents the force sense to a body part including a hand or a foot, and
   wherein the controller controls the stimulation element to form, on the skin, a dynamic quantity distribution corresponding to stretch of the skin generated when the body part is moved.

7. The force sense presentation device according to claim 1, wherein the dynamic quantity distribution is a strain energy density distribution.

8. The force sense presentation device according to claim 7, wherein the controller controls the stimulation element such that a strain energy density increases when the target force sense increases.

9. The force sense presentation device according to claim 7, wherein the stimulation element stimulates the skin by rotational movement, and
   wherein the controller controls a rotation angle and a rotation direction of the stimulation element.

10. The force sense presentation device according to claim 9, wherein
    the controller controls the stimulation element such that the rotation angle of the stimulation element increases when the target force sense increases.

11. The force sense presentation device according to claim 9, wherein a set including a plurality of stimulation elements among the stimulation elements is combined into a stimulation element unit.

12. The force sense presentation device according to claim 11, wherein the stimulation element unit includes a two-axis gimbal.

13. The force sense presentation device according to claim 11, wherein the controller moves a stimulation point for stimulating on the skin of the person and controls the stimulation element such that the rotation angle of the stimulation element increases when a distance from the stimulation point decreases.

14. The force sense presentation device according to claim 1, wherein the dynamic quantity distribution is a distribution of a strain, and
    wherein the strain is a main strain or an equivalent strain.

15. The force sense presentation device according to claim 1, wherein the dynamic quantity distribution is a distribution of a force, and
    wherein the force is a shear force or a vertical resistance force.

16. The force sense presentation device according to claim 1, wherein the dynamic quantity distribution is a distribution of a stress, and
    wherein the stress is any of a pressure, a main stress, and a Mises stress.

17. The force sense presentation device according to claim 1, further comprising:
    a dynamic change detector; and a dynamic quantity distribution calculator,
    wherein the dynamic change detector detects a dynamic change of the skin of the person caused by a motion of the person,
    wherein the dynamic quantity distribution calculator calculates a dynamic quantity distribution of the skin for generating the dynamic change from the change of the dynamic quantity distribution of the skin of the person detected by the dynamic change detector, and
    wherein the controller controls the plurality of stimulation elements to form, on the skin, the dynamic quantity distribution calculated by the dynamic quantity distribution calculator.

18. The force sense presentation device according to claim 17, wherein each of the plurality of stimulation elements includes the dynamic change detector.

19. The force sense presentation device according to claim 17, wherein the dynamic change detector is a sensor provided independently of the stimulation element.

20. The force sense presentation device according to claim 17, further comprising:
    a camera structured to capture a subjective video viewed from the person; and a video synchronizer structured to calculate a relationship between the dynamic change of the skin of the person and a change of the subjective video,
    wherein on a basis of the relationship between the dynamic change of the skin of the person and the change of the subjective video calculated by the video synchronizer, the dynamic quantity distribution calculator calculates the dynamic quantity distribution of the skin for generating the dynamic change from the dynamic change of the skin of the person when the subjective video changes.

21. A force sense presentation method for presenting a force sense by forming a dynamic quantity distribution on a skin of a person, the method comprising:

determining a relationship between the force sense and the dynamic quantity distribution for generating the force sense; and stimulating a plurality of portions of the skin to form, on the skin, the dynamic quantity distribution for generating the force sense, wherein an interval between adjacent portions of the skin to be stimulated is an interval enabling generation of a spatially continuous force sense, wherein the force sense generates a self-kinesthetic sense of the person, wherein the dynamic quantity distribution is a strain energy density distribution.

22. The force sense presentation method according to claim 21, wherein the interval between the adjacent stimulation elements is such an interval that the force senses presented by the adjacent stimulation elements have an overlapping range.

23. A force sense presentation method for presenting a force sense by forming a dynamic quantity distribution on a skin of a person, the method comprising:

determining a relationship between the force sense and the dynamic quantity distribution for generating the force sense;

stimulating a plurality of portions of the skin to form, on the skin, the dynamic quantity distribution for generating the force sense, wherein an interval between adjacent portions of the skin to be stimulated is an interval enabling generation of a spatially continuous force sense, and wherein the force sense generates a self-kinesthetic sense of the person, detecting a dynamic change of the skin of the person caused by a motion of the person;

calculating a dynamic quantity distribution of the skin for generating the dynamic change from the detected dynamic change of the skin of the person; and stimulating a plurality of portions of the skin to form the calculated dynamic quantity distribution on the skin of the person.

24. The force sense presentation method according to claim 23, further comprising:

capturing a subjective video viewed from the person; and calculating a relationship between the dynamic change of the skin of the person and a change of the subjective video, wherein in the calculating the dynamic quantity distribution of the skin for generating the dynamic change, on a basis of the calculated relationship between the dynamic change of the skin of the person and the change of the subjective video, the dynamic quantity distribution of the skin for generating the dynamic change is calculated from the dynamic change of the skin of the person when the subjective video changes.

25. A force sense presentation device that presents a force sense by forming a dynamic quantity distribution on a skin of a person, the device comprising:

a plurality of stimulation elements; and a controller, wherein each of the plurality of stimulation elements stimulates the skin of the person, wherein the controller controls the plurality of stimulation elements such that a dynamic quantity distribution for generating a target force sense is formed on the skin, wherein an interval between adjacent portions of the skin to be stimulated is an interval enabling generation of a spatially continuous force sense, wherein the force sense generates a self-kinesthetic sense of the person, and wherein an interval between adjacent stimulation elements is an interval which is within a range of a two-point discrimination threshold in a region of the skin.

26. A force sense presentation method for presenting a force sense by forming a dynamic quantity distribution on a skin of a person, the method comprising:

determining a relationship between the force sense and the dynamic quantity distribution for generating the force sense; and stimulating a plurality of portions of the skin to form, on the skin, the dynamic quantity distribution for generating the force sense, wherein an interval between adjacent portions of the skin to be stimulated is an interval enabling generation of a spatially continuous force sense, wherein the force sense generates a self-kinesthetic sense of the person, and wherein an interval between adjacent stimulation elements is an interval which is within a range of a two-point discrimination threshold in a region of the skin.

27. A force sense presentation device that presents a force sense by forming a dynamic quantity distribution on a skin of a person, the device comprising:

a plurality of stimulation elements; and a controller, wherein each of the plurality of stimulation elements stimulates the skin of the person, wherein the controller controls the plurality of stimulation elements such that a dynamic quantity distribution for generating a target force sense is formed on the skin, wherein an interval between the adjacent stimulation elements is an interval enabling presentation of a spatially continuous force sense, wherein the force sense generates a self-kinesthetic sense of the person, and wherein the dynamic quantity distribution is a strain energy density distribution.

28. The force sense presentation device according to claim 27, wherein the controller controls the stimulation element such that a strain energy density increases when the target force sense increases.

* * * * *